Figure 1:
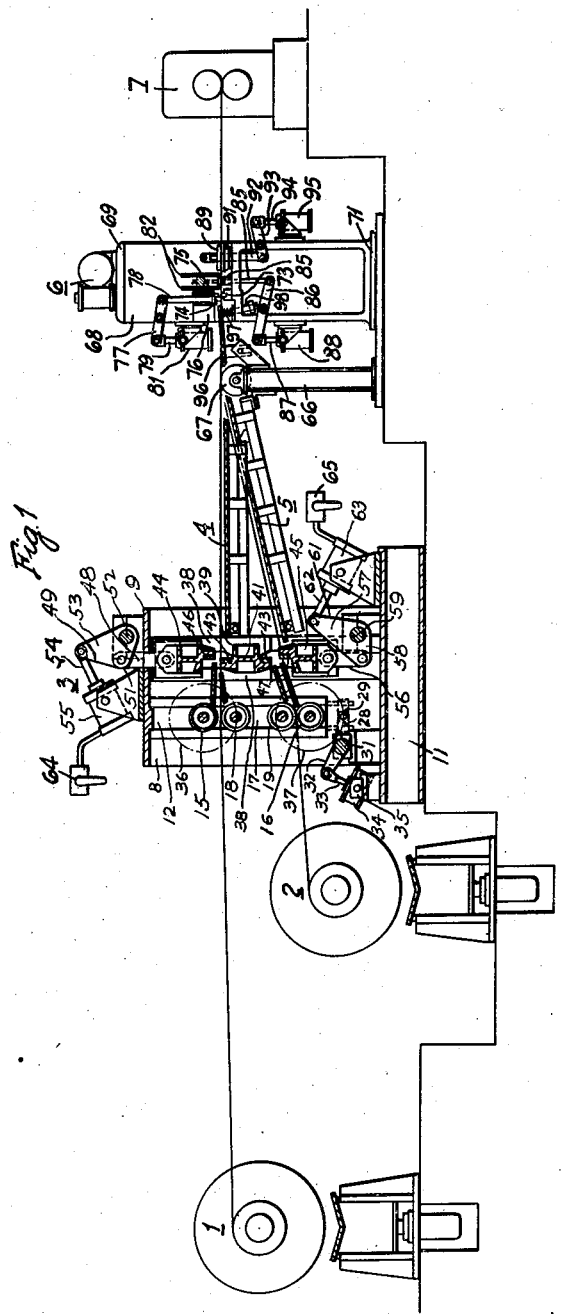
Figure 2:
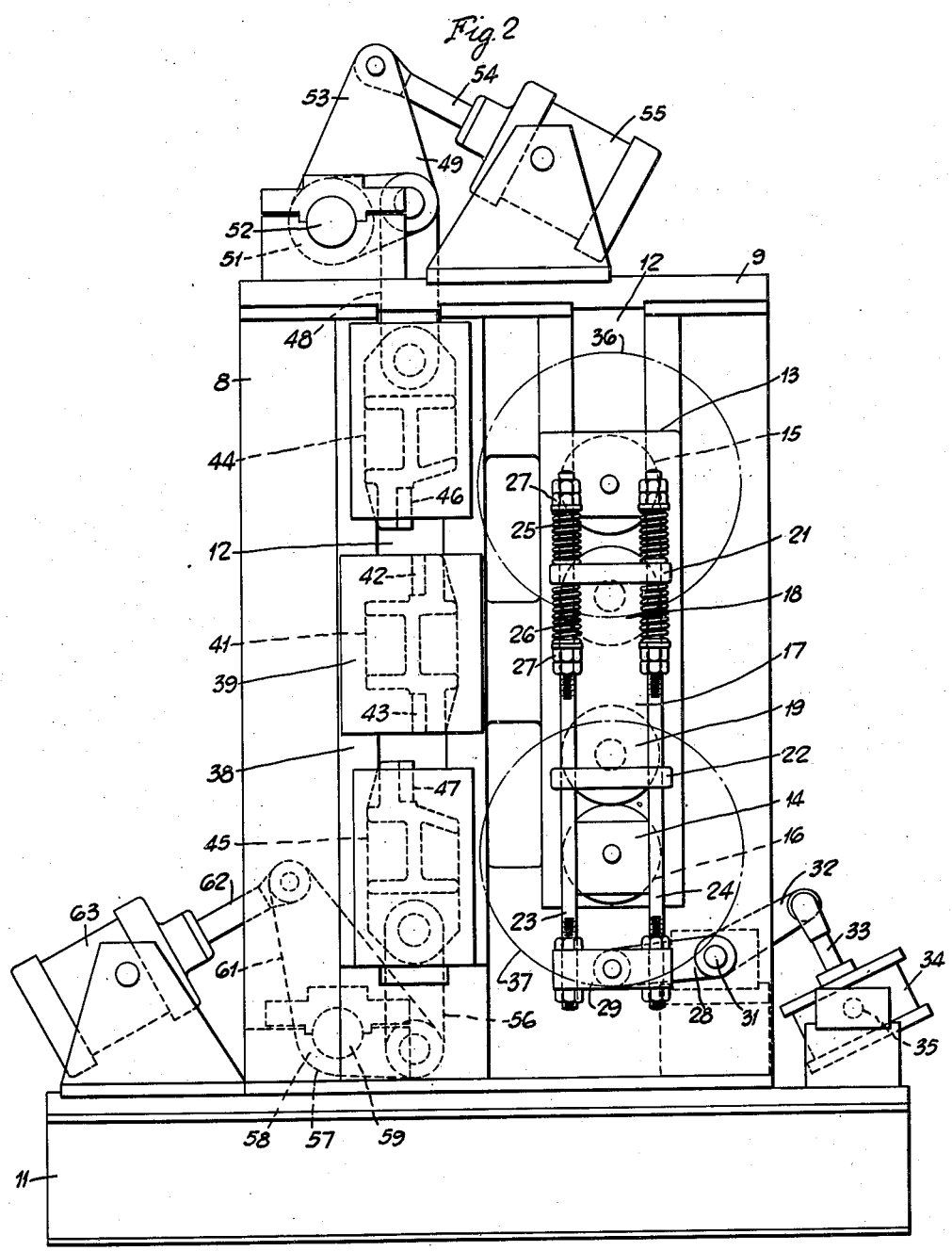
Figure 3:
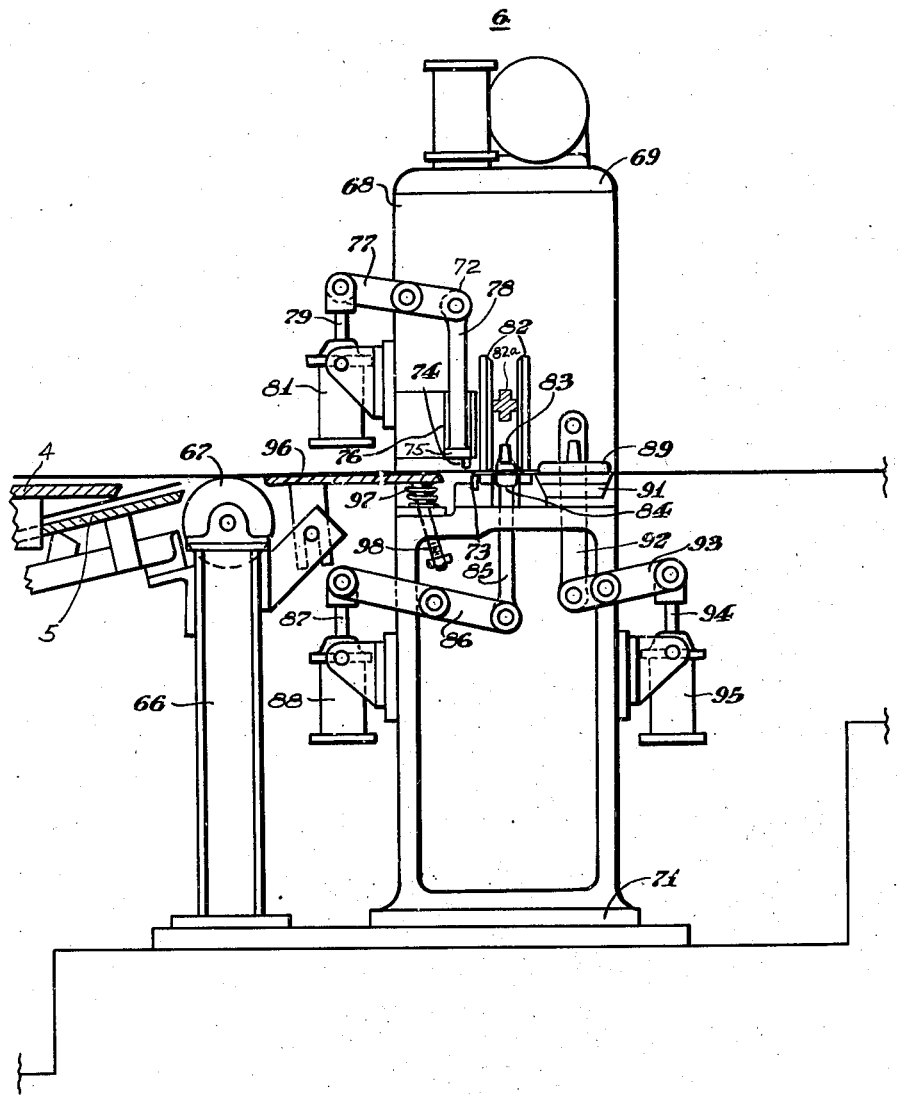

Feb. 20, 1945.　　L. JOHNSON, JR., ET AL　　2,369,830
STRIP HANDLING APPARATUS
Filed Aug. 4, 1940　　3 Sheets-Sheet 1

INVENTOR
Lane Johnson Jr.
Morris D. Stone
BY
Joseph E. Dickinson
ATTORNEY

Patented Feb. 20, 1945

2,369,830

UNITED STATES PATENT OFFICE 2,369,830

STRIP HANDLING APPARATUS

Lane Johnson, Jr., and Morris D. Stone, Pittsburgh, Pa., assignors to United Engineering and Foundry Company, Pittsburgh, Pa., a corporation of Pennsylvania Application August 4, 1940, Serial No. 351,286

7 Claims. (Cl. 219—4)

This invention is an improvement in strip handling and joining apparatus, being particularly applicable for use in connection with continuous strip processing lines or the like.

In the conventional processing lines the strip joining equipment generally employed is not very satisfactory being inefficient in operation, for considerable time is lost when the trailing end of one strip is to be joined to the leading end of the succeeding one. Usually, a single feeding device is provided to handle the strip being supplied from different sources, and hence the trailing end of one coil must be brought up to a welder or other joining means before the leading end of the second coil can be broken away from the coil. Thus, the continuity of the line is broken for a considerable period. On the other hand, if the line is to be continually operated to prevent marking of the strip by remaining in the processing solution, particularly an acid bath, for too long a period, a large looping machine or the like must be provided from which material may be drawn during the strip joining operation.

One of the objects of this invention is to provide apparatus for overcoming the objections to the use of the conventional type strip joining apparatus referred to above.

Another object is to provide apparatus for feeding strip from a plurality of uncoilers adjacent to the welding position so that very little time is required for joining the trailing end of one strip to the leading end of the succeeding one.

Still another object is to provide apparatus for feeding, shearing the leading and trailing ends, clamping and lap welding lengths of metal strips together rapidly and efficiently for further processing.

These and various other objects as well as the various other novel features and advantages of the invention will become apparent from the following detailed description and accompanying drawings of which;

Figure I is a sectional elevation view of the apparatus comprising the entry end of a processing line taken longitudinally;

Figure II is an enlarged elevation view of a multiple shear and pinch roll machine and Figure III an elevation view of the shear and welder combination.

Referring to Figure I by way of explanation, the apparatus comprises spaced uncoilers 1 and 2, multiple pinch roll and shear combination 3, conveyors 4 and 5, a combination shear and welder 6 and pinch roll machine 7.

The multiple pinch roll and shear combination 3 consists of two spaced vertical side frames 8, plate 9 bridging the upper ends and secured thereto, and supporting base 11. Each of the side frames 8 are provided with windows 12 in which are mounted stationary chucks 13 and 14 for supporting the top and bottom pinch rolls 15 and 16 and chucks 17, vertically slidable in windows 12, for supporting the intermediate rolls 18 and 19. Chucks 17 are provided with outwardly extending upper and lower lugs 21 and 22 through which pass rods 23 and 24. These rods are threaded for a considerable distance from the top ends so that top and bottom springs 25 and 26 may be positioned thereon, being separated by the upper lugs 21 and secured in place on the rods by means of adjusting nuts 27. Bell cranks 28 are pivotally mounted in side frames 8 on shaft 31, the inwardly extending arms being connected to cross members 29 secured to the bottom ends of rods 23 and 24 and the outwardly extending arms 32 secured to the ends of piston rods 33 of hydraulic motor 34 which is pivotally mounted in blocks 35. Hand wheels 36 and 37 are provided for turning the top and bottom sets of pinch rolls for feeding strip therethrough.

The side frames 8 are also provided with windows 38 in which is positioned the multiple shear 39, which consists of a stationary head 41 in which are supported blades 42 and 43, and upper and lower movable heads 44 and 45 supporting blades 46 and 47 which cooperate with stationary blades 42 and 43 respectively. The upper blade supporting head 44, being free to slide vertically in the windows 38, is connected through link 48 to one arm 49 of a bell crank 51 mounted on a shaft 52 supported in suitable bearings secured to the plate 9. Pivotally connected to the other arm 53 of the bell crank is a piston rod 54 of hydraulic motor 55 which is also pivotally mounted in suitable bearings on plate 9. The bottom blade supporting head 45 is similarly connected through link 56 to one arm 57 of a bell crank 58 pivotally mounted on shaft 59. The other arm 61 of the bell crank is pivotally connected to the end of piston rod 62 of hydraulic motor 63 supported in suitable bearings mounted on the base 11. Hand valves 64 and 65 are operable for admitting fluid pressure from a source not shown to the top and bottom hydraulic motors 55 and 63 respectively for actuating the upper and lower movable blade supporting heads 44 and 45.

Adjacent to the multiple shear are two guides or conveyors, the top one 4 being horizontal and in communication with the top blades and the lower one 5 being inclined to the horizontal and in communication with the lower blades of the shear. The ends of the conveyors are supported on a pedestal 66 on the top of which is journaled a roller 67.

The shear and welder combination 6 comprises two spaced vertical side frames 68, top bridging plate 69 secured thereto and base 71. The shear 72 consists of a lower stationary blade 73 secured between frames 68 and a cooperating vertically movable blade 74 secured in a head 75 which is free to slide in guides 76. An arm 77 pivotally mounted between the frames is connected at one end to rod 78 of movable head 75 and connected at the other end to a piston rod 79 of hydraulic motor 81 pivotally mounted in suitable bearings on the side frames 68. Adjacent to the shear are a pair of resistance welding rollers 82 which are supported by a crosshead 82a laterally movable across the strips which are to be joined together. Intermediate the two rollers is a clamp, the lower portion 84 of which is positioned between the side frames and the upper communicating vertically movable portion 83 secured to one end of rod 85. The other end of rod 85 is connected to one end of arm 86 pivotally mounted between the side frames 68, the other end of which is connected to piston rod 87 of hydraulic motor 88 pivotally mounted in suitable bearings on side frames 68. Following the welding rollers is a second clamp, the bottom or stationary portion 91 being mounted between the side frames 68 and the upper vertically movable communicating portion 89 being connected at one end to rod 92 which in turn is connected at the other end to arm 93 pivotally mounted between the side frames. Communicating with the opposite end of arm 93 is a piston rod 94 of hydraulic motor 95 pivotally supported in suitable bearings on side frames 68.

Communicating with the roller 67 is a short conveyor section 96 pivotally mounted at one end on pedestal 66. The opposite end, adjacent the shear, is yieldably mounted on a spring 97 which is held in place by a bolt 98 passing therethrough and connected to the section 96 at one end and slidably mounted in the side frames 68 at the other.

A pinch roll machine 7 is positioned adjacent the shear and welder combination 6, and is followed by a looping machine, not shown, for gathering the strip as a reserve from which a supply may be drawn for continuing the succeeding processing operation during the time required for connecting the trailing end of one strip to the leading end of the following one.

The apparatus having been described in detail, the operation of our invention may be briefly summarized as follows:

Coils of metal strip are positioned in the uncoilers 1 and 2 and the strip end broken away from one of the coils, for example the coil positioned in uncoiler 1, and brought up to and placed between the upper pinch rolls 15 and 18 which are closed by operation of hydraulic motor 34. Springs 26 yieldably support the two rolls and provide the necessary traction force to drive the strip through the pinch rolls when the hand wheel 36 is turned. The leading end of the strip is cropped by actuating the upper blade 46 of the shear by means of hydraulic motor 55 and thereupon the strip is fed by the pinch rolls over conveyor 4, roller 67 and through the shear and welder combination to the driven pinch roll machine 7 which feeds the strip through the processing line.

During the time that the strip from the coil in uncoiler 1 is being fed through the line, the leading end of the coil in uncoiler 2 is broken away, brought up to the multiple pinch roll machine and positioned between the lower rolls which are brought together by actuating hydraulic motor 34 in the reverse direction. The upper springs 25 yieldably support the rolls and provide the necessary traction force to drive the strip through the pinch rolls when the lower hand wheel 37 is turned. The leading end of the strip is cropped by actuating the lower blade 47 of the shear by means of hydraulic motor 63. The strip is then fed through the shear and the feeding operation continued until the leading end of the strip is adjacent to the roller 67, but not quite in communication with the strip passing over conveyor 4 from uncoiler 1, at which point the feeding is discontinued.

As soon as the trailing end of the strip from uncoiler 1 reaches the short conveyor section 96, the pinch roll machine 7 is stopped, the clamp 91 operated to firmly engage the strip and the upper movable blade 74 actuated by introducing fluid pressure to hydraulic motor 81 from any suitable source not shown. Thereupon, the lower hand wheel 37 of the bottom pinch rolls is again turned and the strip from uncoiler 2 fed into the shear and welder combination 6 until the leading end strikes the clamping member 89. Thus, the leading end of the strip overlaps the trailing end of the previous strip so that the strip ends are in position for welding, which is accomplished by actuating the clamps 84, and moving the welding rolls laterally of and in contact with the strip. It is a feature of this invention that the distance from the shearing line of blades 73 and 74 to the adjacent welding roller is equal to the distance between the clamp 89 and its adjacent welding roller. Since the welding rollers are very close to the shear blades and the clamp, the welds formed are at the ends of the overlapped strips so that there is no danger of the strip ends at the weld being fouled by bending back on themselves further on in the processing line, which frequently occurs when the lap weld is not properly made.

As soon as the weld is completed, the clamps are released, the motor operated pinch roll machine 7 again actuated and the strip from uncoiler 2 drawn through the line. A new coil may then be placed on the uncoiler 1 and the leading end prepared and welded to the trailing end of the strip issuing from the uncoiler 2 in a similar fashion to that disclosed herein in connection with the preparing and welding of the leading end of the strip issuing from uncoiler 2 to the trailing end of the strip issuing from uncoiler 1.

According to the provisions of the patent statutes, we have explained the principle and operation of our invention and have illustrated and described what we consider to represent its best embodiment. However, we desire to have it understood that, within the scope of the appended claims, the invention may be practiced otherwise than as specifically illustrated and described.

We claim:

1. In combination with a line for successively processing a plurality of pieces of strip material, a plurality of coil supports, combination feeding and deflecting apparatus incorporating a plurality of cooperating feeding rolls, a pair of superposed shears at the delivery end of said feeding mechanism, a plurality of guides for directing successive pieces of the strip material to a common point, a second shear and welder for preparing the pieces of strip material and joining the ends thereof together, and means for directing the connected strip away from said shear and welder.

2. The combination for successively joining together the ends of a plurality of metallic strips comprising a clamp for restraining one of the strips adjacent to its trailing end, a shear for cropping the trailing end therefrom to prepare the strip for welding, a stop forming part of said clamp and with which the leading end of a succeeding strip previously prepared for welding comes in contact, a second clamp for clamping together the overlapped strip ends, and a pair of welding rolls, one positioned on either side of said last mentioned clamp, movable transversely to weld said strips together.

3. The combination according to claim 2 in which the welding rolls are positioned equidistant from said shear and said first mentioned clamp.

4. The combination for successively feeding and joining together the ends of a plurality of metallic strips comprising a plurality of coil supports, combination feeding and deflecting apparatus incorporating a plurality of cooperating feeding rolls, a pair of superposed shears at the delivery end of said feeding mechanism for cropping the leading end of each of the strips passing therethrough, a plurality of guides for directing the strips to a common point, a clamp for engaging one of the strips adjacent to its trailing end, a second shear adapted to crop the end thereof to prepare the strip for welding, a stop forming part of said clamp and with which the leading end of a succeeding strip previously prepared for welding comes in contact, a second clamp for clamping together the overlapped strip ends, and a pair of welding rolls, one positioned on either side of said last-mentioned clamp movable transversely across said strips to weld them together.

5. The combination according to claim 4 in which the welding rolls are positioned equidistant from said second shear and said first-mentioned clamp.

6. The combination according to claim 4 in which the welding rolls are positioned adjacent to and between said second-mentioned shear and said first-mentioned clamp.

7. The combination for successively joining together the ends of a plurality of pieces of metallic strip comprising a plurality of coil supports, combination feeding and deflecting apparatus incorporating a plurality of cooperating feeding rolls, a pair of superposed shears at the delivery end of said feeding mechanism for cropping the leading end of the strip passing therethrough, a plurality of guides for directing successive pieces of the strip to a common point, a clamp for restraining one of the pieces adjacent to its trailing end, a second shear adapted to crop the end thereof to prepare the strip for welding, a stop forming part of said clamp and with which the leading end of a succeeding strip previously prepared for welding comes in contact, a second clamp for clamping together the overlapped strip ends, and welding means positioned on either side of said last-mentioned clamp movable transversely of the overlapped strip ends to weld them together.

LANE JOHNSON, Jr.
MORRIS D. STONE.